Oct. 16, 1956  A. CIALLIE  2,766,664
METHODS OF CUTTING GEARS
Filed Sept. 26, 1950  3 Sheets-Sheet 1

Oct. 16, 1956   A. CIALLIE   2,766,664
METHODS OF CUTTING GEARS
Filed Sept. 26, 1950   3 Sheets-Sheet 3

United States Patent Office 2,766,664
Patented Oct. 16, 1956

2,766,664

METHODS OF CUTTING GEARS

Arturo Ciallie, Turin, Italy

Application September 26, 1950, Serial No. 186,766

4 Claims. (Cl. 90—5)

This invention relates to methods and tools for cutting gears; it is a continuation-in-part of my parent application Serial No. 8,793 filed February 17, 1948, now abandoned.

It is known to cut spur and bevel gears having curved teeth by the continuous generating process by means of circular cutting heads arranged in a plane substantially tangential to the pitch surface of gears to be cut.

In the machines operated in accordance with this process of the prior art, circular cutting heads are employed; these cutting heads support a plurality of cutting tools, of which two act as finishing cutters, while the others are roughing cutters. One of these cutters is adapted to cut the concave flank of the tooth by means of its outer cutting edge and the other one is adapted to cut the convex flank by means of its inner cutting edge.

In the gears cut by means of these known machines, each tooth flank has a contact zone which extends throughout the tooth length. In order to reduce this contact zone or to localize it within suitable limits on the tooth flanks, hitherto special machines are used and these machines are operative on the gear cut by the first mentioned machine.

The main object of the instant invention is to provide an improved gear cutting tool having the shape of a disc on which a number of roughing and finishing cutters are arranged; these finishing cutters are so positioned as to localize the contact zone on a tooth flank within predetermined limits in the same gear cutting continuous generating process; it is, therefore, one of the objects of the invention to localize the contact zone without employing any machine other than the gear cutting machine itself.

According to this invention a number of finishing cutters are located on a rotatable cutting device, these cutters include one main finishing cutter to work one flank of the tooth, a second main finishing cutter to work the second flank of the tooth, the radial distance of these two main finishing cutters from the axis of rotation being substantially equal, a number of further finishing cutters being arranged in proximity to each of said main finishing cutters, the radial distance of the second mentioned finishing cutters from the axis of rotation being such as to localize the contact zone within predetermined limits on the tooth flanks generated by said two main finishing cutters.

This invention will now be described more in detail and with reference to the accompanying drawings, in which.

When the contact between the flanks of gear teeth is not a full contact, it should occur tangentially; in other words, the curves should be tangential to each other along the line of contact, that is, the perpendiculars to said curves in the point of contact should coincide with each other. In order that this may take place in the case of circular curves the following requirements should be simultaneously met;

(a) The radii should be different;

(b) The radius of a convex flank should be smaller than that of the concave flank;

(c) The centers of the above mentioned circular curves should be aligned on a straight line;

(d) The said centers should also lie on the circle which is the path of the center of the tool, during the operation of cutting and continuous generating of the gears.

Figure 1:
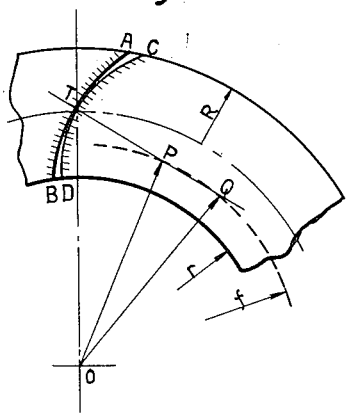
Figure 1 shows diagramatically a convex flank and a concave flank of bevel gears with localized contact.

Fig. 1 shows diagrammatically the type of contact fulfilling the above mentioned requirements. In the case of bevel gears ATB is the concave flank of a tooth, CTD is the convex flank of another tooth meshing with the former both being developed on the pitch plane of their common crown gear having a center O, limited by circles having the radii $r$ and $R$. The centers P, Q of the circular curves ATB and CTD are aligned on the straight line TPQ and they simultaneously lie on the circle having a radius $f$ and a center O, said circle being the path followed by the center of the tool during continuous generation of the tooth, $f$ being the distance (eccentricity) from the tool axis with respect to the general axis of the machine which is also the axis of the ideal crown gear.

The diagram of Figure 1 is difficult to carry out in practice, above all because the above mentioned requirement necessarily implies angles TPO and TQO being only very slightly different from 90°. As the angle OTQ should be approximately 60° for practical requirements, the tool radius should be about one-half the mean radius of the crown gear (intermediate between $r$ and $R$), that is, it would be too small for practical construction.

According to the diagram of Figure 1, the curve ATB is described by the outer cutting edge of a finishing cutter (called an external cutter), of which the axis lies in the position Q, QT being consequently the radius of said outer cutting edge on the pitch plane of the crown gear. The curve CTD is described by the inner cutting edge of a further finishing cutter (called an internal cutter), of which the axis is in the position P, PT being consequently the radius of said inner cutter on the pitch plane of the crown gear.

For the sake of clearness it has been assumed that the curves ATB and CTD are the flanks of the teeth of two gears meshing together, but, as will be seen hereinafter, when they are developed on the pitch plane of the crown gear said curves may be considered as the concave and convex flanks of the teeth of one gear, with the precaution that all curves should be rigidly rotated with their centers through one pitch or one-half pitch in order to obtain the tooth sections as they are usually seen.

Figure 2:
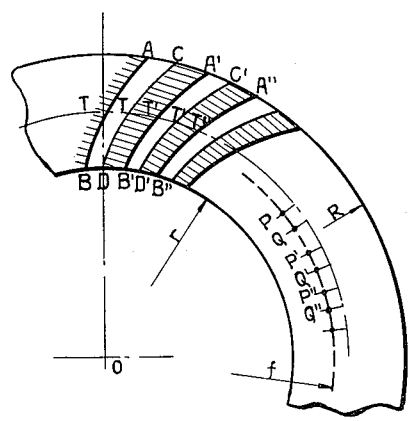
Figure 2 shows a portion of a crown gear (that is a bevel gear in which the pitch cone angle equals 90 degrees) with curved teeth.

Figure 2 shows a portion of a crown gear in which the curves of Figure 1 are geometrically transferred as mentioned above in order to form a conventional gear.

Figure 2, however, does not supply any expressive indication as Figure 1, although it shows the same set of teeth.

Since the device shown in Figure 1, which permits cutting, by means of two finishing cutters of curved teeth with a contact localized at point T, is useless in practice, as explained above, each flank of the tooth is generated according to this invention by a corresponding finishing cutter referred to as "main finishing cutter" and by a suitable number of further finishing cutters adjacent each main finishing cutter, each of said second mentioned finishing cutters being situated at such a radius from the cutter center as to localize during its cutting stroke a contact zone within predetermined limits on a tooth flank.

Cutting the convex flank

Figure 3:
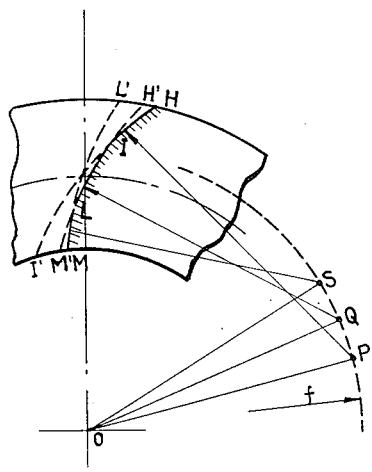
Figure 3 shows diagrammatically the convex flank of bevel gear generated according to this invention.

Figure 3 shows a curved tooth the convex flank of which is generated according to this invention in which the tooth flank is composed of three tangential surfaces, each formed by a separate finishing cutter; the intersections of said surfaces with the pitch plane of the crown gear are shown by the circular curves HI, IL, and LM having a radius HP, IQ, LS and a center P, Q, S, respectively; all of said centers are lying on the circular path having a radius $f$ and a center O followed by the tool axis during the cutting of the tooth. The three above mentioned surfaces are substantially derived from the surface HII'—H'ILM' and L'LM. The portions of the surfaces H'I—II'—L'L—LM' are included in the hollow space between the convex and concave flanks.

Cutting the concave flank

Figure 4:
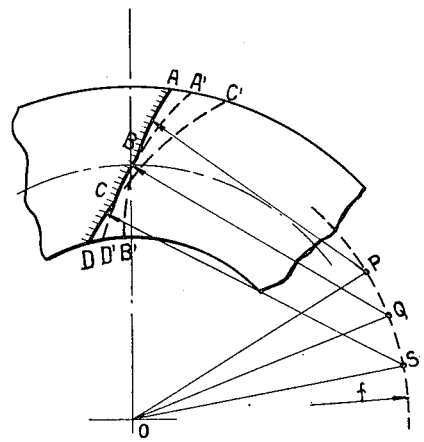
Figure 4 shows diagrammatically the concave flank of a bevel gear generated according to this invention.

The manner of carrying out the invention in connection with the concave flank of a bevel gear is shown in Figure 4 in which the three tangential surfaces ABB'—A'BCD'—C'CD described by curves having a radius AP—BQ—CS and a center P, Q, S, respectively form the concave flank ABCD. The portions of the surfaces A'B—C'C—BB'—CD' are included in the hollow space between the concave and convex flanks. The centers P, Q, S, all lie on the circular path having a radius $f$ and a center O followed by the tool axis during cutting of the teeth. The points I, L in Figure 3 and B, C in Figure 4 are the projections on the pitch plane of a crown gear of the lines of intersection between the above mentioned surfaces which are, therefore, juxtaposed according to the height of the teeth.

Generally, both the convex and concave flanks may consist of a plurality of surfaces generated by a plurality of finishing cutters in the manner described above. However, it has been found that one of the tooth flanks should preferably be constituted by a surface generated by one finishing cutter only while the other tooth flank consists of a plurality of surfaces generated by a plurality of finishing cutters.

It has been found particularly convenient to generate the concave flank by means of one finishing cutter and the convex flank by means of a plurality of finishing cutters. This is explained by the fact, which is easily understood on comparing Figures 3 and 4, that in practice the tooth flank has a smaller surface on the convex flank with respect to the concave flank.

Cutting bevel gears

The details for carrying out the devices referred to above in connection with bevel gears shall now be described.

The process of continuous generation of bevel gears with curved teeth by means of a circular head tool is characterized by continuous rotation both of tool and blank, which means that for one full turn of the blank the tool performs as many rotations as there are teeth to be cut. Since, as is well known, for the purpose of simplification the crown gear is considered instead of the gear to be cut, on one turn of the tool the former rotates above its axis through an angle corresponding to the pitch of the teeth to be cut. Consequently, it is easy to calculate the angular rotation of the crown gear corresponding to a predetermined angle of rotation of the tool.

The crown gear is generally assumed to be stationary, while the center of the tool rotates above the center of the crown gear at the same angular speed of the crown gear, as calculated above as a function of the angular speed of the tool about its center.

In this manner, the geometrical considerations are materially simplified. In the example shown in Figure 3, assuming that Q is the position taken by the center of the tool when the finishing cutter referred to as "main cutter" describes the surface of which the track on the pitch plane of the crown gear is the curve M'LIH'. It is understood that the radius of the inner cutting edge on said pitch plane should be equal to QI. If it is desired for the path MLL' to be described by the cutter following the main cutter, the arc SQ will be calculated on the basis of the angle formed between the two cutters, of the eccentricity $f$, modulus and radius on the larger basis. According to the desired position of the points I on the curve M'LIH, the radius SM is then ascertained for the cutter preceding the main cutter. The position of point P and radius PH are calculated by the same method, etc. In the case of Figure 4, the main cutter describes the curve D'CBA'.

Cutting spur gears

Figure 5:
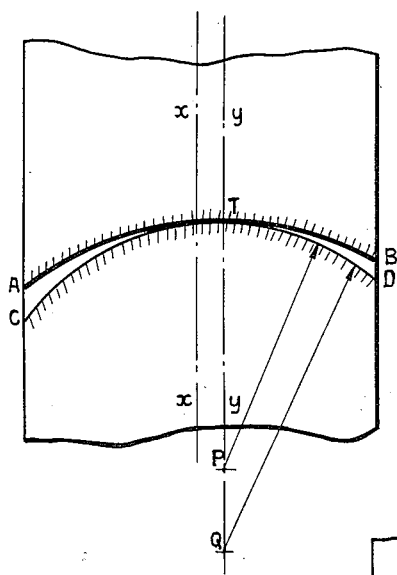
Figure 5 shows diagrammatically a convex and concave flank respectively of a spur gear with localized contact.

Referring now to spur gears, Figure 5 shows a portion of a plane rack in which $x$—$x$ is the center line of the rack and $y$—$y$ is the straight line which is the path of the tool centers during cutting of the tooth. Figure 5 shows one pair only of intermeshing flanks, more particularly a concave flank ATB and a convex flank CTD, and the flanks are tangential to each other at the point T.

In the case of spur gears the tangential contact as shown in Figure 5 does not meet with any particular difficulty, nor is it necessary to use tools of small diameter. However, the method of forming one or both flanks of spur gears by means of a plurality of finishing cutters is very useful in practice.

Figure 6:
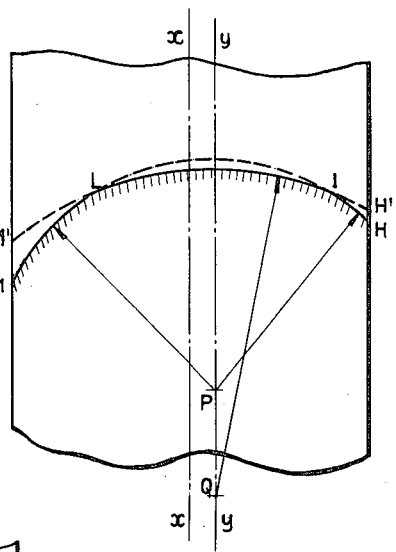
Figure 6 shows diagrammatically the convex flank of a spur gear generated according to this invention.

In Figure 6 the concave flank is composed of two surfaces each formed by a finishing cutter, said surfaces being shown in section on the pitch plane of the set of teeth by the circular curves HILM—H'ILM' having a radius HP, IQ, and a center P, Q, respectively; the centers are lying on the straight path $yy$ of the tool centers. As explained above in connection with bevel gears the portion of the surfaces H'I, LM', are included in the hollow space between the concave and convex flanks.

Figure 7:
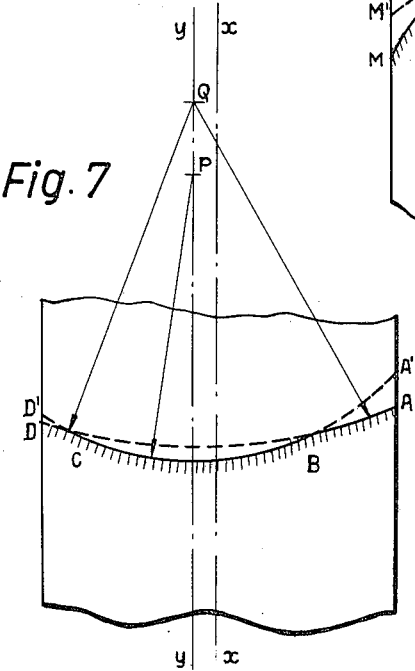
Figure 7 shows diagrammatically the concave flank of a spur gear generated according to this invention.

In Figure 7 the concave flank is composed of the two surfaces shown by the circular curves ABCD, A'BCD' described with a radius AQ, BP and a center Q, P, respectively; the centers are lying on the straight line $yy$ passing through the tool centers. The portions A'B—CD' are included in the hollow space between the concave and convex flanks.

As to the details necessary for carrying out the system described in connection with spur gears, it should be noted that the calculation of the displacement, undergone by the portion of the tool center on the straight line $yy$ during a rotation corresponding to the angle between two successive cutters, is very simple in the case of spur gears. Once the finishing cutters have been turned and the displacements of the corresponding positions of the tool center have been graphically and analytically calculated, it is easy by the above mentioned process to calculate graphically or analytically the radii of the individual finishing cutters necessary to obtain the curves desired as in Figures 6 and 7.

The cutting tool

Figure 8:
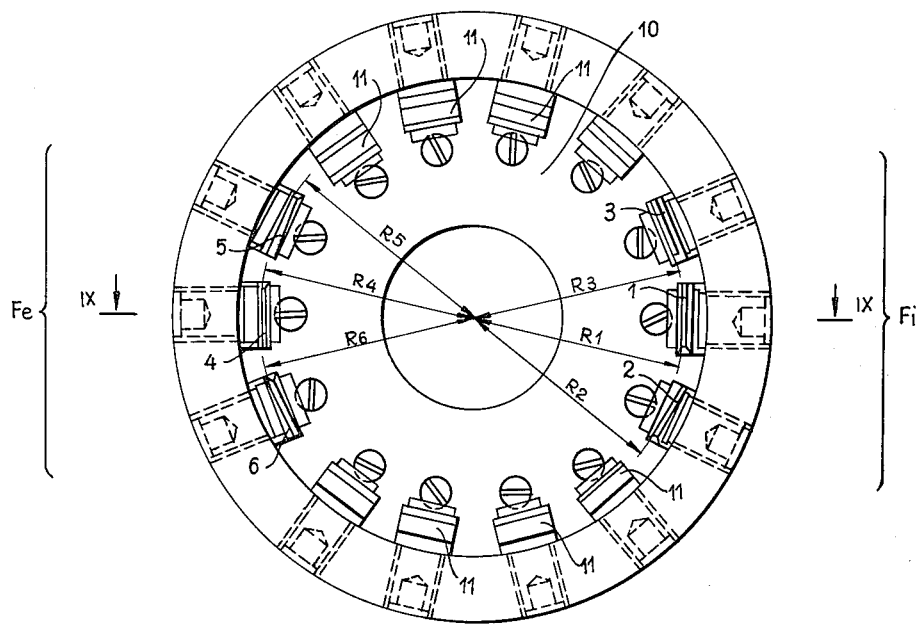
Figure 8 is a plan view of a rotary cutter in accordance with an embodiment of the invention.
Figure 9:
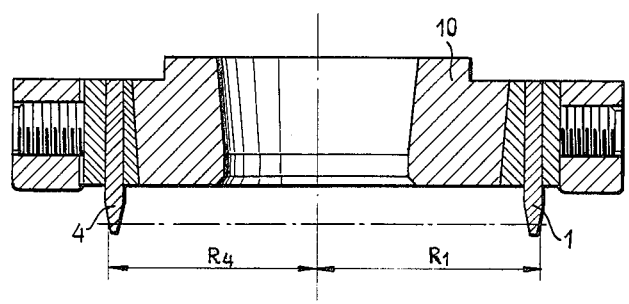
Figure 9 is a sectional view taken on line IX—IX of Figure 8.

Figure 8 shows a cutting tool 10 supporting a series of cutting edges 11 of which those denoted by numerals 1 to 6 are finishing cutters. Fi denotes the internal finishing cutter group adapted to cut, for instance, the convex flank MLIH of Figure 3. The main finishing cutter 1 is located at a radius $R_1$, equalling the distance QL, while the adjacent cutters 2 and 3 are located at the radial distance from the cutter center, respectively, $R_2=PH$ and $R_3=SM$. The three above mentioned finishing cutters will travel during their cutting stroke along the paths M'LIH', HII' and MLL', respectively, as the center O of disc 10 takes the positions P, Q, S, of Figure 3.

Similarly, Fe denotes the outer finishing cutter group arranged to cut the concave flank DCBA of Figure 4. 4 is the main outer finishing cutter having further finishing cutters 5 and 6 adjacent thereto, said three finishing cutters being located at the radial distances $R_4$, $R_5$ and $R_6$, respectively, equaling the distances QB, SD, PA of Figure 4. The radial distances $R_1$ and $R_4$ are substantially equal. In some cases, the finishing cutters 5 and 6 may be suppressed, when the corresponding tooth flank will be cut by the main finishing cutter 4 only.

When one of the flanks of the spur or bevel gears is formed by means of one finishing cutter only, the other flank being formed by a plurality of finishing cutters, the main cutter will be the finishing cutter of which the radius is substantially equal to the radius of the finishing cutter generating the other flank.

In this case, the contact between the teeth is localized on the surface generated by the main finishing cutter. For instance, in the example of Figure 3, the contact is localized on the arc LI. It is obvious that, in order to localize the contact on a predetermined region of the tooth flank, it will suffice to calculate in a suitable manner, as explained above, the radii of the finishing cutters adjacent the main finishing cutter.

In the method described above, no mention has as yet ben made of the pressure angle of the finishing cutters adapted to form a flank. According to this invention, these said finishing cutters should have substantially the same pressure angle or they should have different pressure angles for particular purposes as the case may be.

The above described method and apparatus afford a further improvement advantage by calculating and predetermining the radii and positions of the finishing cutters of each flank in such a manner that their parts are substantially, though at times only partly, superposed on each other. By operating in this manner and applying the constructional details described above, the various finishing cutters carry out a smoothing action on the said flank.

I claim:

1. The method of cutting curved teeth on spur and bevel gear blanks which comprises employing a rotary disc cutter head having at least one main finishing cutter on one face located at a predetermined distance from the radial center of the head and having at least two supplementary finishing cutters on said face on opposite sides of the main cutter and both at different radial distances from said radial center which are different from the radial distance of the main cutter from the radial center of the head rotating, said disc cutter head about its geometric axis, translating the axis of the cutter head in a circular path about the axis of the ideal crown wheel relative to the blank, said translation of said cutter head axis being in predetermined timed relation to the rotation of said cutter head about its own axis, and engaging the cutters with the work blank so that the main finishing cutter and its associated supplementary cutters respectively function successively to generate a tooth flank, the said main finishing cutter cutting a localized pressure area on and intermediate the ends of a tooth flank and the supplementary finshing cutters moving along paths intersecting one another and intersecting the path of the main finishing cutter and each functioning to cut an area of the tooth flank at one side of said localized area.

2. The method according to claim 1 wherein in the forming of bevel gears the said circular path of the cutter head is concentric with the turning axis of the ideal crown wheel and the geometric axis of the cutter head substantially parallels the turning axis of the ideal crown wheel.

3. The method according to claim 1 wherein in the forming of spur gears the said circular path of the cutter head is concentric with the turning axis of the gear blank and the geometric axis of the cutter head is substantially perpendicular to the turning axis of the blank.

4. In the cutting of a gear blank to produce thereon gear teeth each having a longitudinal convex and concave flank with the convex flank having a smaller arc than the concave flank, the method which comprises employing rotary disc cutter head having two diametrically positioned main finishing cutters on one face and at approximately the same radial distance from the radial center of the head and having at least two supplementary finishing cutters on said face on opposite sides of one of said main finishing cutters and at different radial distances from said radial center which are different from the radial distance of the main cutters from the radial center of the head, rotating said disc cutter head about its geometric axis, translating the axis of the cutter head in a circular path about an ideal crown wheel relative to the gear blank, said translation of said cutter head axis being in a predetermined timed relation to the rotation of said cutter head about its own axis, and engaging the cutters of the rotating head with the work blank to bring the main cutters successively into engagement therewith so that the main cutters and the supplementary cutters associated with the said one thereof function to generate said convex and concave flanks on each tooth, the said one main finishing cutter cutting a localized pressure area on and intermediate the ends of the convex flank and the supplementary finishing cutters moving along paths intersecting one another and intersecting the path of said one main finishing cutter and each functioning to cut an area of the convex flank at one side of the said localized area and the other main finishing cutter functioning to cut the concave flank.

References Cited in the file of this patent

UNITED STATES PATENTS

| | | |
|---|---|---|
| 1,133,516 | Weaver | Mar. 30, 1915 |
| 1,555,482 | Pfluger | Sept. 29, 1925 |
| 2,070,191 | Wildhaber | Feb. 9, 1937 |

FOREIGN PATENTS

| | | |
|---|---|---|
| 331,973 | Great Britain | July 17, 1930 |
| 336,220 | Great Britain | Oct. 2, 1930 |